(12) United States Patent
Miyashita et al.

(10) Patent No.: US 9,702,777 B2
(45) Date of Patent: Jul. 11, 2017

(54) SENSOR MODULE AND METHOD FOR PRODUCING SENSOR MODULE

(71) Applicant: NAGANO KEIKI CO., LTD., Tokyo (JP)

(72) Inventors: Kaori Miyashita, Tokyo (JP); Eiji Takeda, Tokyo (JP); Yuuji Nagai, Tokyo (JP); Shinya Matsumura, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 58 days.

(21) Appl. No.: 14/993,745

(22) Filed: Jan. 12, 2016

(65) Prior Publication Data

US 2016/0202136 A1 Jul. 14, 2016

(30) Foreign Application Priority Data

Jan. 14, 2015 (JP) ................. 2015-005021

(51) Int. Cl.
*G01L 9/00* (2006.01)

(52) U.S. Cl.
CPC ............ *G01L 9/0058* (2013.01); *G01L 9/006* (2013.01); *G01L 9/0044* (2013.01); *G01L 9/0055* (2013.01)

(58) Field of Classification Search
CPC .................................................... G01L 9/0058
USPC ........................................................ 73/726
See application file for complete search history.

(56) References Cited

FOREIGN PATENT DOCUMENTS

| EP | 1965187 | 9/2008 |
|---|---|---|
| EP | 2498075 A2 | 9/2012 |
| JP | 09-243472 | 9/1997 |
| JP | 2004-055946 | 2/2004 |
| JP | 3691842 | 6/2005 |
| JP | 2013-219259 | 10/2013 |
| WO | 97/32320 A1 | 9/1997 |

OTHER PUBLICATIONS

European Search Report dated Oct. 18, 2016, 12 pages.
Partial European Search Report dated Jul. 1, 2016, 7 pages.

*Primary Examiner* — Laura Martin
*Assistant Examiner* — Jean Morello
(74) *Attorney, Agent, or Firm* — Rankin, Hill & Clark LLP

(57) ABSTRACT

A detector is provided by coating a fluid conductive material on a flat portion of a diaphragm. The detector includes: a resistor element; resistor element electrodes, which are overlapped and connected with mutually opposed parts of the resistor element; and a linear conductor connected with the resistor element electrodes. The resistor element electrodes each include: a linear portion having a linear inner side facing an inner side of paired one of the resistor element electrodes; and peripheral portions defined at both ends of the linear portion, at least one of the peripheral portions being connected with the linear conductor. All of the linear portions are arranged so that inner sides are arranged mutually in parallel. The resistor element is connected with the linear portion. The peripheral portions are exposed without being connected with the resistor element.

6 Claims, 5 Drawing Sheets

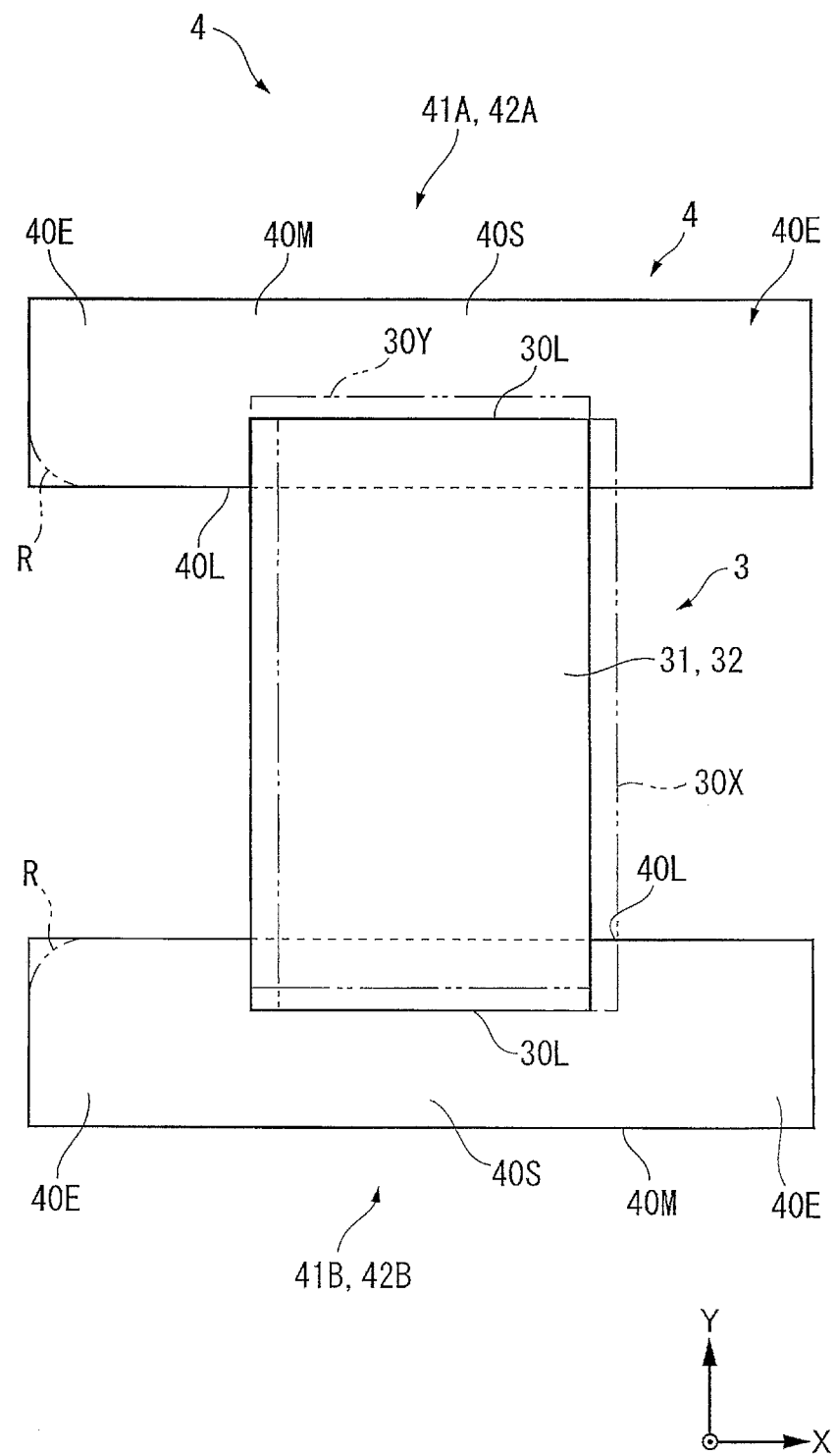

SENSOR MODULE AND METHOD FOR PRODUCING SENSOR MODULE

The entire disclosure of Japanese Patent Application No. 2015-005021 filed Jan. 14, 2015 is expressly incorporated by reference herein.

TECHNICAL FIELD

The present invention relates to a sensor module and a method for producing the sensor module.

BACKGROUND ART

Some of sensor modules of pressure sensors include a diaphragm, on which four resistor elements each configured to detect a strain, resistor element electrodes connected to the resistor elements and a linear conductor are formed. The linear conductors each serve as a connector for the resistor element electrodes, terminal(s) and the like and each have a predetermined wiring pattern.

A typical example of the sensor module includes a diaphragm, on which a plurality of linear conductors and resistor element electrodes are formed using screen printing. A resistor element is formed between adjacent ones of the resistor element electrodes using screen printing (Patent Literature 1; Japanese Patent No. 3691842).

In Patent Literature 1, the resistor element electrodes are thinly formed to face each other and the resistor element is formed in a rectangle in a plan view so that the resistor element covers the resistor element electrodes at both sides thereof.

A typical example of a dynamic quantity sensor configured to detect dynamic quantity includes: a metal substrate configured to receive the dynamic quantity; a multilayered insulation layer covering a surface of the metal substrate; a rectangular strain-resistance element printed and burned on the surface of the multilayered insulation layer; and a linear conductor printed and burned so as to be connected with the strain-resistance element (Patent Literature 2; JP-A-9-243472).

A typical example of a printed resistor, which is applicable to an electronic circuit unit, includes a pair of mutually parallel belt-shaped linear conductor patterns on one side of an insulation board, and a resistor provided between the linear conductor patterns (Patent Literature 3; JP-A-2004-55946).

In the typical example disclosed in Patent Literature 1, the resistor element, resistor element electrodes, and linear conductors are formed by the screen printing, in which a conductive paste is pushed out through an opening of a screen using a squeegee. Specifically, in order to form a pair of resistor element electrodes, the conductive paste is thinly pasted on the diaphragm. In order to form the resistor element, the conductive paste is pasted between the pair of resistor element electrodes in a form of a rectangle in a plan view. Usually, in order to reduce the amount of the conductive material to be pasted, the conductive paste is pasted so that a peripheral end of the resistor element electrode aligns with an end of the resistor element.

However, since the paste has fluidity, when the conductive paste is linearly pasted on the diaphragm using the screen printing, the shape of the paste is slightly rounded at the start of the pasting (i.e. the peripheral portion). When a part of the resistor element electrode formed by the screen printing is rounded and the resistor element is overlapped with the rounded part, the distance (i.e. resistance) of the resistor element varies along a longitudinal direction of the resistor element electrode. Though it is necessary to adjust the resistances of the four resistor elements to a predetermined value, when the connection statuses between the resistor elements and the resistor element electrodes respectively differ, each of the resistor element exhibits different resistance. When the resistances differ as described above, the offset value of the sensor becomes uneven, thereby requiring troublesome output adjustment in use.

In the typical example disclosed in Patent Literature 2, since the width of the strain-resistance element is set large with respect to the width of the linear conductor, even when the strain-resistance element is misaligned during the printing process, variation in temperature characteristics of the strain-resistance element can be restrained. However, the typical example disclosed in Patent Literature 2 does not, as in the typical example of Patent Literature 1, provide any solution for the above problem associated with the start of the printing of the linear conductor.

The typical example disclosed in Patent Literature 3 is applied to an electronic circuit unit and is not used for pressure measurement. In addition, only a set of a pair of conductive patterns and a resistor is disclosed, where nothing is suggested on the problem associated with the difference in the resistances of the four resistor elements defining a bridge circuit.

SUMMARY OF THE INVENTION

An object of the invention is to provide a sensor module with small variations in differences in resistances of a plurality of resistor elements and capable of easily performing an output adjustment, and a method for producing the sensor module.

A sensor module according to an aspect of the invention includes: a bottomed-cylindrical module body comprising a diaphragm; and a detector configured to detect a pressure, the detector being provided by coating a fluid conductive material to a flat portion of the diaphragm, in which the detector includes: a plurality of resistor elements each configured to detect a strain; a pair of first and second resistor element electrodes, mutually opposed parts of each of the resistor elements being respectively overlapped with the pair of resistor element electrodes; and a linear conductor connected to an end of each of the pair of resistor element electrodes, the pair of resistor element electrodes each include: a linear portion having a linear inner side, the inner side of the first resistor element electrode facing the inner side of the second resistor element electrode; and peripheral portions on both ends of the linear portion, at least one of the peripheral portions being connected to the linear conductor, the linear portion being arranged so that all of the inner sides are parallel with each other, and the resistor element is connected with the linear portion and the peripheral portions are exposed without being connected with the resistor element.

In the above aspect of the invention, the resistor element is remote from the peripheral portions of the pair of resistor element electrodes and necessarily overlaps the linear portion. Accordingly, even when a print failure occurs when the detector is formed on the diaphragm, the dimension of the part of the resistor element interposed between the pair of resistor element electrodes becomes constant. Accordingly, the difference in resistances between the plurality of resistor elements can be eliminated, thereby facilitating the output adjustment.

In the sensor module according to the above aspect of the invention, it is preferable that the module body includes: a metallic bottomed cylindrical member comprising a cylindrical portion and a closure portion that closes an opening of the cylindrical portion; and a ceramic plate portion provided to the bottomed cylindrical member, the diaphragm includes the closure portion and the plate portion of the bottomed cylindrical member, and the detector is provided on a flat surface of the plate portion.

According to the above arrangement, the sensor module can be efficiently produced by forming (printing) the detector on the ceramic plate portion, and bonding the plate portion to the closure portion of the bottomed cylindrical member.

According to the above arrangement, since the detector is directly formed on the plate portion, the mass production of the sensor module is easily achievable. For instance, a large-size ceramic plate may be prepared, a plurality of detectors may be formed (printed) on the ceramic plate, and the ceramic plate is cut at predetermined positions to produce the plate portions provided thereon with the detectors. Each of the plate portions provided thereon with the detectors is bonded to the closure portion of the separately provided metallic bottomed cylindrical member, thereby further enhancing the efficiency of the mass production of the sensor module.

In the sensor module according to the above aspect of the invention, it is preferable that a material of the resistor element electrode is different from a material of the linear conductor.

According to the above arrangement, expensive material (e.g. gold) is used for an important component (i.e. the resistor element electrode) and relatively inexpensive material (e.g. silver-palladium alloy) is used for the linear conductor, thereby reducing production cost for the entire sensor module.

In the sensor module according to the above aspect of the invention, it is preferable that the resistor element is rectangular in a plan view, and mutually opposed linear sides of the resistor element each are located between the inner side and an outer side opposed to the inner side of the linear portion of the pair of resistor element electrodes.

According to the above arrangement, since the resistor element does not protrude beyond the outer side of the resistor element electrode, the amount of the material can be reduced.

In the sensor module according to the above aspect of the invention, it is preferable that widths of the resistor element electrodes are the same.

According to the above arrangement, the production of the sensor module can be facilitated.

A method according to another aspect of the invention is for producing the sensor module according to the above aspect of the invention, the method including: coating a fluid conductive material on a flat surface of the diaphragm in a first direction to form the pair of resistor element electrodes, coating a fluid conductive material between the pair of resistor element electrodes on the flat surface of the diaphragm in a second direction intersecting the first direction to form the resistor element; and forming the linear conductor after the resistor element is formed.

According to the above aspect of the invention, the above-described effects of the sensor module can be obtained.

BRIEF DESCRIPTION OF DRAWING(S)

FIG. 2 is a plan view showing a relevant part of the first exemplary embodiment.

DESCRIPTION OF EMBODIMENT(S)

First Exemplary Embodiment

A first exemplary embodiment of the invention will be described below with reference to FIGS. 1A to 3B.

Figure 1A:
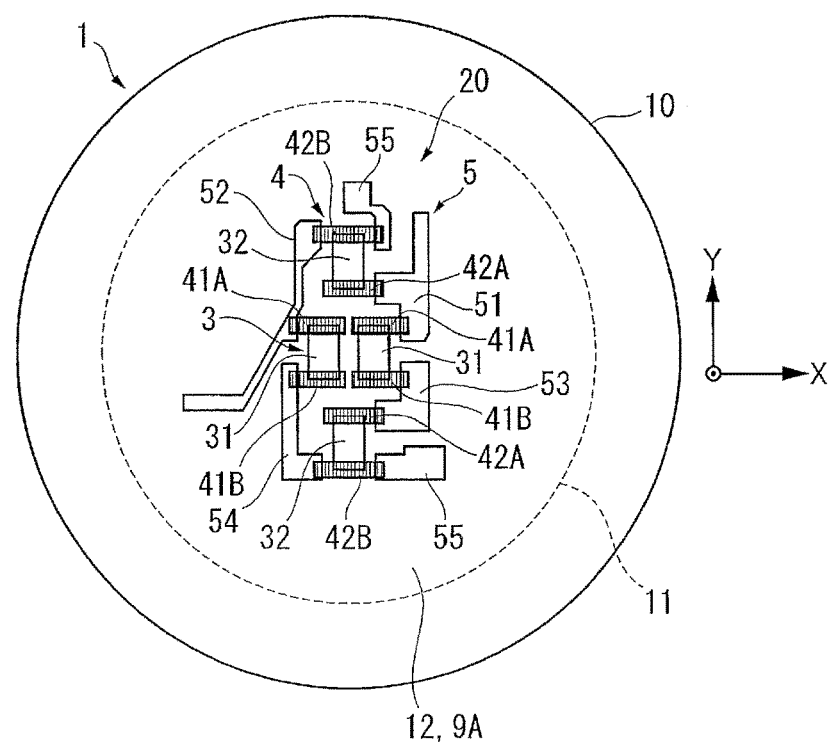
FIG. 1A is a plan view showing a sensor module according to a first exemplary embodiment of the invention.
Figure 1B:
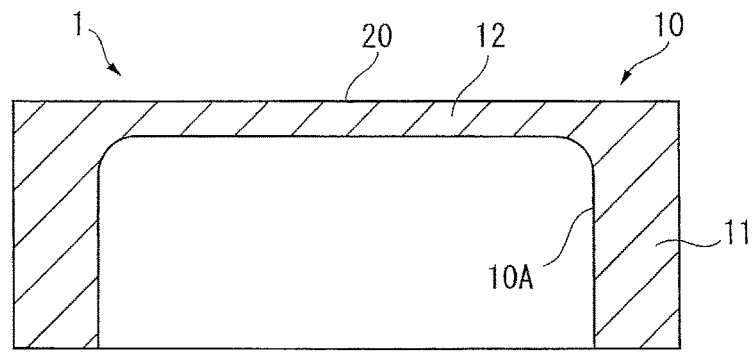
FIG. 1B is a cross sectional view showing the sensor module according to the first exemplary embodiment of the invention.

FIGS. 1A and 1B each show an overall arrangement of a sensor module 1 of the first exemplary embodiment, in which FIG. 1A is a plan view of the sensor module 1 and FIG. 1B is a cross sectional view of the sensor module 1.

As shown in FIGS. 1A and 1B, the sensor module 1 includes a module body 10, and a detector 20 provided on the module body 10 by coating a fluid conductive material.

The module body 10 is a bottomed cylindrical member including a cylindrical portion 11 and a thin diaphragm 12 closing an opening of the cylindrical portion 11, and is made of a ceramic material.

A detector 20 is provided on a flat portion of the diaphragm 12. A recess 10A into which a to-be-measured fluid is introduced is defined by a side of the diaphragm 12 opposite the side on which the detector 20 is provided, and an inner circumferential surface of the cylindrical portion 11.

The sensor module 1 of the first exemplary embodiment is a pressure sensor device, in which the diaphragm 12 is displaced by a pressure of the to-be-measured fluid introduced into the recess 10A and the displacement of the diaphragm 12 is detected by the detector 20.

A protection film (not shown) is provided on the detector 20.

As shown in FIG. 1A, the detector 20 includes four resistor elements 3 each for detecting a strain (representative one of the resistor elements 3 sometimes being referred to as a resistor element 3), resistor element electrodes 4 connected to the resistor elements 3 (representative one of the resistor element electrodes 4 sometimes being referred to as a resistor element electrode 4), and linear conductors 5 connected to an end of each of the resistor element electrodes 4 (representative one of the linear conductors 5 sometimes being referred to as a linear conductor 5).

The resistor elements 3 are strain gauges formed of a paste suitable for resistor element (e.g. ruthenium oxide). The resistor element electrodes 4 are made of gold (Au). The linear conductors 5 are made of a silver-palladium alloy (silver-palladium). The above listed materials are fluid conductive material.

It should be noted that the resistor element electrode 4 is drawn in vertical stripes to highlight the presence of the resistor element electrode 4 with respect to the other components in FIG. 1A.

Two of the four resistor elements 3 define first resistor elements 31 arranged in parallel with each other in X direction at the center of the diaphragm 12, and others of the four resistor elements 3 define second resistor elements 32 arranged along Y direction across the two first resistor elements 31. The four resistor elements 3 have the same shape in a plan view.

The first resistor elements 31 and the second resistor elements 32 are rectangular in a plan view and are disposed so that longitudinal directions of the first resistor elements 31 and the second resistor elements 32 extend along the Y direction.

The resistor element electrode 4 includes a pair of first resistor element electrodes 41A, 41B connected to each of the first resistor elements 31 and a pair of second resistor element electrodes 42A, 42B connected to each of the second resistor elements 32. The four resistor element electrodes 4 have the same shape in a plan view.

FIG. 2 shows how the first resistor element electrodes 41A, 41B are connected to one of the first resistor elements 31.

As shown in FIG. 2, the first resistor element electrodes 41A, 41B are respectively positioned at mutually opposite sides of the first resistor element 31. The first resistor element electrodes 41A, 41B are connected to the first resistor element 31 in a manner that central portions of the first resistor element electrodes 41A, 41B overlap the first resistor element 31.

The first resistor element electrodes 41A, 41B each have a rectangular shape in a plan view. The first resistor element electrodes 41A, 41B each have a linear portion 40S having a mutually facing linear inner side 40L, and peripheral portions 40E continuously provided on both ends of the linear portion 40S.

The linear portions 40S are disposed so that the inner side 40L of the first resistor element electrode 41A is in parallel with the inner side 40L of the first resistor element electrode 41B. The linear portion 40S is a region to be connected with the first resistor element 31.

The peripheral portions 40E are exposed without being connected with the first resistor element 31. The length and width of the linear portion 40S are set considering an error caused when the first resistor element 31 is printed. Inner sides of the peripheral portions 40E are preferably collinear with the inner side 40L, however, it is not requisite that the peripheral portions 40E are collinear with the inner side 40L.

One of the peripheral portions 40E of each of the first resistor element electrodes 41A, 41B are connected to the linear conductor 5 (see FIG. 1A).

Mutually opposed linear sides 30L of the first resistor element 31 each are located between the inner side 40L and an outer side 40M opposed to the inner side 40L of the linear portion 40S of each of the first resistor element electrodes 41A, 41B.

The second resistor element electrodes 42A, 42B are respectively positioned at mutually opposite sides of the second resistor element 32. The second resistor element electrodes 42A, 42B are connected to the second resistor element 32 in a manner that central portions of the second resistor element electrodes 42A, 42B overlap the second resistor element 32.

The second resistor element electrodes 42A, 42B have the same configuration as that of the first resistor element electrodes 41A, 41B. In other words, the second resistor element electrodes 42A, 42B each have a rectangular shape in a plan view including the linear portion 40S and the peripheral portions 40E. The linear portion 40S is connected with the second resistor element 32. The peripheral portions 40E are exposed without being connected with the second resistor element 32.

The second resistor element electrode 42A is disposed closer to the center of the diaphragm 12 relative to the second resistor element electrode 42B. One of the peripheral portions 40E of the second resistor element electrode 42A is connected to the linear conductor 5 (see FIG. 1A). The second resistor element electrode 42B is disposed remote from the center of the diaphragm 12. Both of the peripheral portions 40E of the second resistor element electrode 42B are connected to the linear conductor 5 (see FIG. 1A).

The widths of the first resistor element electrodes 41A, 41B and the second resistor element electrodes 42A, 42B are the same.

Mutually opposed linear sides of the second resistor element 32 each are located between the inner side and an outer side opposed to the inner side of the linear portion 40S of each of the second resistor element electrodes 42A, 42B.

As shown in FIG. 1A, the linear conductor 5 includes a first conductor 51 connecting the first resistor element electrode 41A and the second resistor element electrode 42A, a second conductor 52 connecting the first resistor element electrode 41A and the second resistor element electrode 42B, a third conductor 53 connecting the first resistor element electrode 41B and the second resistor element electrode 42A, a fourth conductor 54 connecting the first resistor element electrode 41B and the second resistor element electrode 42B, and a fifth conductor 55 connecting the second resistor element electrode 42B and a pad (not shown).

The first conductor 51, the second conductor 52, the third conductor 53, the fourth conductor 54 and the fifth conductor 55 each have wide linear portion.

Figure 3A:
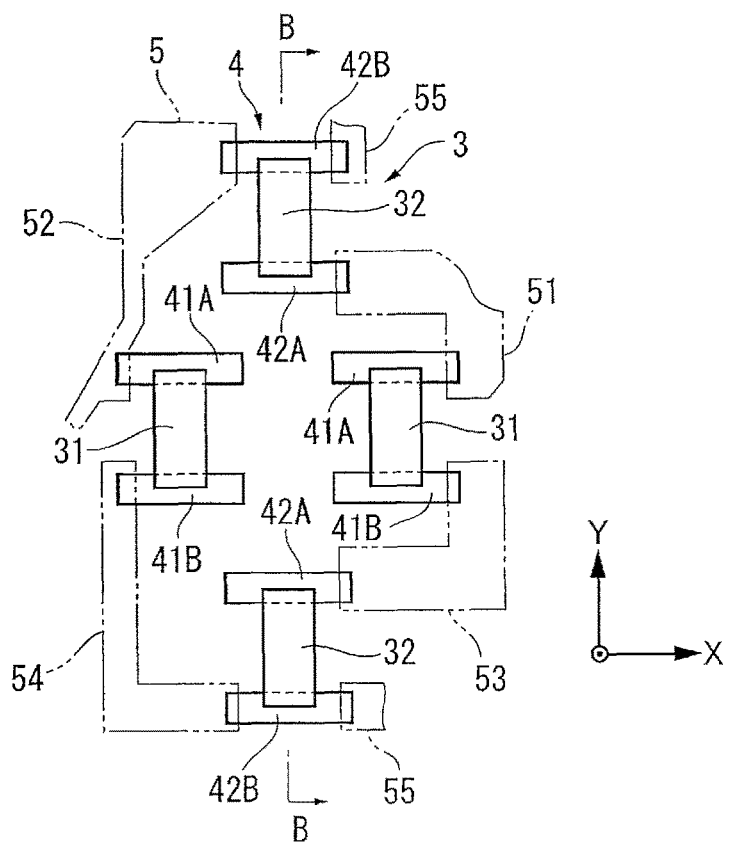
FIG. 3A is a plan view showing a process for producing the sensor module.
Figure 3B:
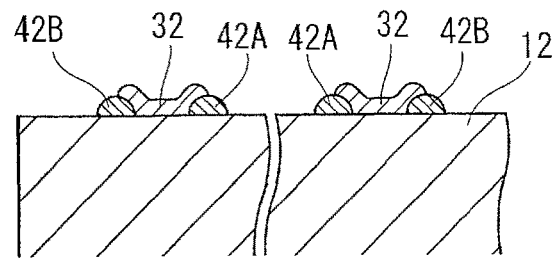
FIG. 3B is a cross sectional view viewed in a direction indicated by arrows B-B in FIG. 3A, showing the process for producing the sensor module.

Next, a method for producing the sensor module 1 will be described with reference to FIGS. 3A and 3B. FIG. 3A is a schematic plan view of the relevant part. FIG. 3B is a schematic illustration of a cross section of the relevant part.

As shown in FIGS. 3A and 3B, fluid gold is coated along a first direction (e.g. the X direction) on a flat portion of the diaphragm 12 of the module body 10 having been prepared in advance to form the first resistor element electrodes 41A, 41B and the second resistor element electrodes 42A, 42B. In this state, the cross section of each of the first resistor element electrodes 41A, 41B and the second resistor element electrodes 42A, 42B is slightly bulged at the central portion thereof (see FIG. 3B).

Subsequently, a fluid resistor element paste is coated on the flat portion of the diaphragm 12 in a second direction (e.g. the Y direction) orthogonal to the first direction to screen-print the resistor elements 3.

In other words, the first resistor elements 31 are printed so that the first resistor elements 31 connect the first resistor element electrodes 41A and 41B, and the second resistor elements 32 are printed so that the second resistor elements 32 connects the second resistor element electrodes 42A and 42B. Both ends of each of the first resistor elements 31 overlap the first resistor element electrodes 41A and 41B. Both ends of each of the second resistor elements 32 overlap the second resistor element electrodes 42A and 42B (see FIG. 3B).

Further, fluid silver-palladium alloy is coated to screen-print the linear conductors 5.

In some instances, due to print failure, a corner R of at least one of the first resistor element electrodes 41A, 41B and second resistor element electrodes 42A, 42B is not sufficiently formed to be rounded (see imaginary lines in FIG. 2).

Furthermore, due to the print error caused between the first resistor element electrodes 41A, 41B and the first resistor element(s) 31, the first resistor element(s) 31 may sometimes be misaligned in the X direction (see reference sign 30X in FIG. 2), or in the Y direction (see reference sign 30Y in FIG. 2) with respect to the first resistor element electrodes 41A, 41B. Print misalignment similar to that between the first resistor element electrodes 41A, 41B and the first resistor element(s) 31 also occurs between the second resistor element electrodes 42A, 42B and the second resistor element(s) 32.

Even when at least one of the corner(s) R of the first resistor element electrode(s) 41A, 41B and the second resistor element electrode(s) 42A, 42B is not squared due to the print misalignment, the non-squared corner stays within the peripheral portion(s) 40E.

Further, even when the first resistor element 31 (second resistor element 32) is misaligned in the X direction (see reference sign 30X), or in the Y direction (see reference sign 30Y) with respect to the first resistor element electrodes 41A, 41B (second resistor element electrodes 42A, 42B), since the first resistor elements 31 (second resistor elements 32) overlaps the linear portions 40S, the dimension of the first resistor elements 31 (second resistor elements 32) each between the linear portions 40S of the pair of the first resistor element electrodes 41A, 41B (second resistor element electrodes 42A, 42B) stays constant, so that the presence of the print misalignment does not result in the differences in the resistances of the first resistor elements 31 (second resistor elements 32).

The first exemplary embodiment provides the following effects.

(1) The detector 20 is provided by coating a fluid conductive material on the flat portion of the diaphragm 12. The detector 20 includes: the resistor elements 3; the resistor element electrodes 4, which are overlapped and connected with mutually opposed parts of each of the resistor elements 3; and the linear conductors 5 connected with the resistor element electrodes 4. The resistor element electrodes 4 each include: the linear portion 40S having a linear inner side (i.e. a side facing the other one of the resistor element electrodes 4); and the peripheral portions 40E defined at both ends of the linear portion 40S, at least one of the peripheral portions 40E being connected with the linear conductor 5. All of the linear portions 40S of the resistor element electrodes 4 are disposed so that the inner sides 40L are arranged mutually in parallel. The resistor element 3 is connected with the linear portion 40S. The peripheral portions 40E are exposed without being connected with the resistor element 3. Accordingly, even when a print misalignment occurs, the misalignment degree becomes constant between the resistor element 3 and the corresponding resistor element electrodes 4. Thus, the dimensions of the resistor elements 3 between the resistor element electrodes 4 are equalized to eliminate the difference in areas of the resistor elements 3 (i.e. the difference in resistances), so that the output adjustment can be facilitated.

(2) Since gold is used only for forming the resistor element electrodes 4 and the linear conductors 5 are provided by relatively inexpensive silver-palladium alloy, the production cost can be reduced as compared with an instance where all of the resistor element electrodes 4 and the linear conductors 5 are provided by gold.

(3) The resistor element 3 is rectangular in a plan view and the mutually opposed linear sides 30L of the resistor element 3 each are located between the mutually opposed outer side and inner side of one of the resistor element electrodes 4. Thus, since the resistor element 3 does not protrude beyond the outer side of the resistor element electrode 4, the amount of the material can be reduced.

(4) The resistor element electrode 4 includes the two first resistor element electrodes 41A, 41B and the two second resistor element electrodes 42A, 42B, and the widths of the resistor element electrodes 41A, 41B, 42A, 42B are the same. Accordingly, the production of the sensor module 1 can be facilitated.

(5) Since the four resistor element electrodes 4 have the same shape in a plan view, the variation in the resistances can be restrained, thereby facilitating the output adjustment.

Second Exemplary Embodiment

A second exemplary embodiment of the invention will be described below with reference to FIGS. 4A and 4B.

The arrangement of the second exemplary embodiment is the same as that of the first exemplary embodiment except for the shape of the linear conductor in a plan view. In the description of the second exemplary embodiment, the same numeral will be attached to the same components as those in the first exemplary embodiment to omit the description thereof.

Figure 4A:
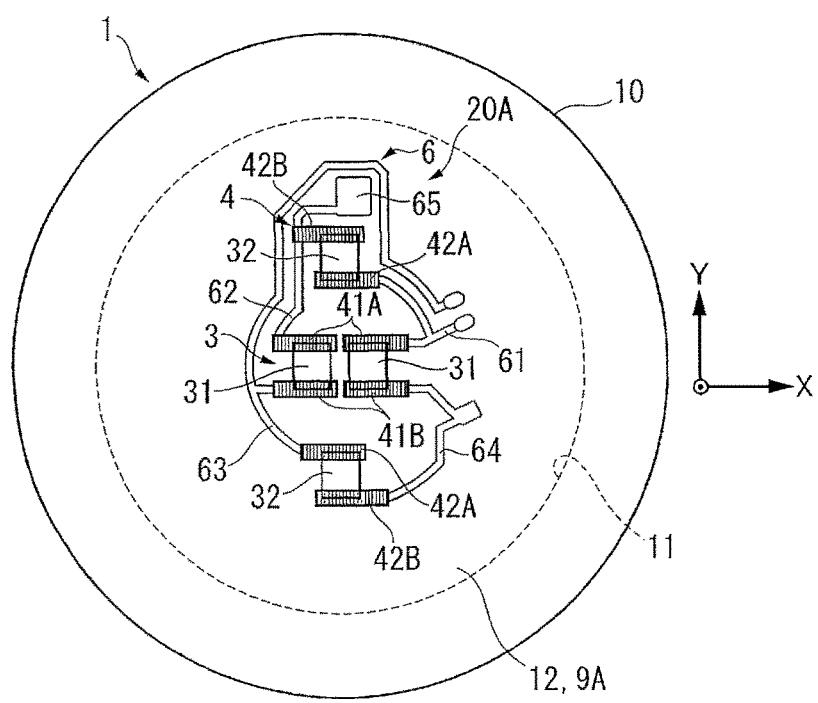
FIG. 4A is a view corresponding to FIG. 1A and showing a sensor module according to a second exemplary embodiment of the invention.
Figure 4B:
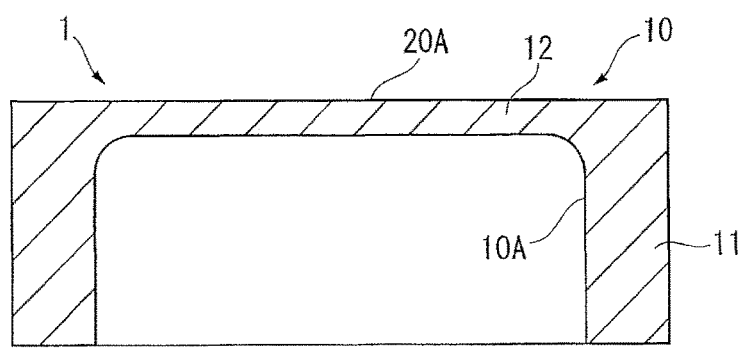
FIG. 4B is a view corresponding to FIG. 1B and showing the sensor module according to the second exemplary embodiment of the invention.

FIGS. 4A and 4B are views respectively corresponding to FIGS. 1A and 1B and showing a sensor module according to a second exemplary embodiment.

As shown in FIGS. 4A and 4B, a detector 20A is provided on a flat portion of the diaphragm 12.

The detector 20A includes the resistor element 3, the resistor element electrode 4 and a linear conductor 6.

The linear conductor 6 includes a first conductor 61 connecting the first resistor element electrode 41A and the second resistor element electrode 42A, a second conductor 62 connecting the first resistor element electrode 41A and the second resistor element electrode 42B, a third conductor 63 connecting the first resistor element electrode 41B and the second resistor element electrode 42A, a fourth conductor 64 connecting the first resistor element electrode 41B and the second resistor element electrode 42B, and a fifth conductor 65 connecting the second resistor element electrode 42B and a pad (not shown).

The first conductor 61, the second conductor 62, the third conductor 63, the fourth conductor 64 and the fifth conductor 65 each have narrower width than that of the first conductor 51, the second conductor 52, the third conductor 53, the fourth conductor 54 and the fifth conductor 55 of the first exemplary embodiment, and have an arc portion in a plan view at a predetermined part thereof.

The method for producing the sensor module 1 and associated advantages in the second exemplary embodiment are the same as those in the first exemplary embodiment.

Third Exemplary Embodiment

Next, the third exemplary embodiment of the invention will be described below with reference to FIG. 5.

The arrangement of the third exemplary embodiment is the same as that of the first exemplary embodiment except for the portion at which the detector 20 is provided. In the description of the third exemplary embodiment, the same numeral will be attached to the same components as those in the first exemplary embodiment to omit the description thereof.

Figure 5:
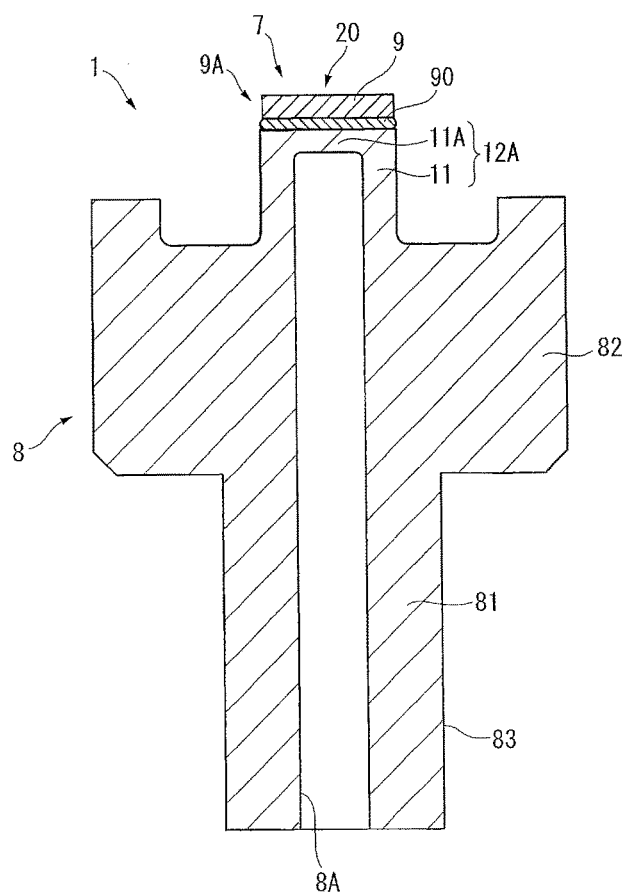
FIG. 5 is a plan view showing a sensor module according to a third exemplary embodiment of the invention.

FIG. 5 shows a sensor module according to the third exemplary embodiment.

As shown in FIG. 5, the sensor module 1 according to the third exemplary embodiment includes a module body 7 integrated with a joint 8.

The joint 8 is a metal member including a shaft 81 in which an introduction port 8A configured to introduce a to-be-measured fluid is formed, and a flange 82 radially extending from the center of the shaft 81.

A screw portion 83 configured to be screwed with a to-be-attached portion (not shown) is provided to an end of the shaft 81.

The module body 7 of the third exemplary embodiment includes: a metallic bottomed cylindrical member 12A including a cylindrical portion 11 and a closure portion 11A closing an opening of the cylindrical portion 11; and a ceramic plate portion 9 provided to the bottomed cylindrical member 12A.

The closure portion 11A and the plate portion 9 of the bottomed cylindrical member 12A are bonded through an adhesion layer 90. It should be noted that the plate portion 9 and the adhesion layer 90 in FIG. 5 are illustrated thicker than actually is for the sake of visibility.

In the third exemplary embodiment, the diaphragm 9A is defined including the closure portion 11A, the plate portion 9 and the adhesion layer 90.

In order to integrate the other end of the shaft 81 of the joint 8 and the bottomed cylindrical member 12A, a metallic rod member may be machined. Alternatively, the bottomed cylindrical member 12A and the joint 8 may be separately produced and welded with each other.

The plate portion 9 has the same circular shape as that of the bottomed cylindrical member 12A in a plan view. The shape of the plate portion 9 in a plan view is not necessarily circular but may be, for instance, octagonal.

The detector 20 is provided on a flat portion of the plate portion 9. Since the plate portion 9 is made of a ceramic, an insulation layer is not necessarily provided on the flat portion.

It should be noted that, though the shape of the detector 20 in a plan view is the same as that in the first exemplary embodiment (see FIGS. 1A and 1B), the shape of the detector 20 may alternatively be the same as that of the detector 20A in the second exemplary embodiment.

Next, a method for producing the sensor module 1 will be described.

Initially, a large-size ceramic plate for producing the plate portion 9 is prepared and a plurality of the detectors 20, 20A are formed on the large-size ceramic plate. In order to form the detectors 20, 20A, fluid gold is coated at a plurality of points on the large-size ceramic plate along the first direction to form the first resistor element electrodes 41A, 41B and the second resistor element electrodes 42A, 42B. Subsequently, a fluid resistor element paste is coated along the second direction to screen-print the resistor element 3. Further, fluid silver-palladium alloy is coated to screen-print the linear conductor 5.

After the plurality of detectors 20, 20A are formed on the large-size ceramic plate, the large-size ceramic plate is cut to separate the detectors 20, 20A to provide a plurality of plate portions 9 having the detectors 20, 20A thereon.

In addition, the adhesion layer 90 is provided on the closure portion 11A of the bottomed cylindrical member 12A prepared in advance, and the plate portion 9 provided with the detector 20, 20A is bonded and fixed on the adhesion layer 90.

Accordingly, the third exemplary embodiment provides the following effects in addition to the effects (1) to (5) in the first exemplary embodiment.

(6) The module body 7 includes the metallic bottomed cylindrical member 12A, the ceramic plate portion 9 provided on the bottomed cylindrical member 12A, and the detector 20, 20A provided on the flat portion of the plate portion 9. Accordingly, by accurately forming the detector 20, 20A on the plate portion 9, mass production of the sensor module 1 can be efficiently performed.

(7) In order to produce the sensor module 1, a plurality of detectors 20, 20A are formed on the large-size ceramic plate and subsequently the large-size ceramic plate is cut to produce the plurality of plate portions 9 each provided thereon with the detector 20, 20A. Accordingly, the mass production of the sensor module 1 can be efficiently performed.

Incidentally, it should be understood that the scope of the present invention is not limited to the above-described exemplary embodiment(s) but includes modifications and improvements as long as the modifications and improvements are compatible with the invention.

For instance, though the resistor element electrode 4 and the linear conductor 5 are made of different materials in the above exemplary embodiments, the resistor element electrode 4 and the linear conductor 5 may be made of the same material (e.g. gold).

Though the first resistor element electrodes 41A, 41B and the second resistor element electrodes 42A, 42B are formed into rectangles (in a plan view) having the same widths, the width of the first resistor element electrodes 41A, 41B and the second resistor element electrodes 42A, 42B may be different.

Though the sensor module 1 is described as a pressure sensor device for detecting the pressure of the to-be-measured fluid in the above exemplary embodiments, the sensor module 1 may be a physical quantity measurement sensor for detecting, for instance, temperature.

Further, though a plurality of detectors 20, 20A are formed on a large-size ceramic plate in order to produce the sensor module in the third exemplary embodiment, the large-size ceramic plate may be cut to produce the plate portions 9 and the detectors 20, 20A may be formed on each of the plate portions 9 in the third exemplary embodiment.

What is claimed is:

1. A sensor module comprising:
   a bottomed-cylindrical module body comprising a diaphragm; and
   a detector configured to detect a pressure, the detector being provided by coating a fluid conductive material to a flat portion of the diaphragm, wherein,
   the detector comprises: a plurality of resistor elements each configured to detect a strain; a pair of first and second resistor element electrodes, mutually opposed parts of each of the resistor elements being respectively overlapped with the pair of resistor element electrodes; and a linear conductor connected to an end of each of the pair of resistor element electrodes,
   the pair of resistor element electrodes each comprise: a linear portion having a linear inner side, the inner side of the first resistor element electrode facing the inner side of the second resistor element electrode; and peripheral portions on both ends of the linear portion, at least one of the peripheral portions being connected to the linear conductor, the linear portion being arranged so that all of the inner sides are parallel with each other, and the resistor element is connected with the linear portion and the peripheral portions are exposed without being connected with the resistor element.

2. The sensor module according to claim 1, wherein the module body comprises: a metallic bottomed cylindrical member comprising a cylindrical portion and a closure portion that closes an opening of the cylindrical portion; and a ceramic plate portion provided to the bottomed cylindrical member, the diaphragm comprises the closure portion and the plate portion of the bottomed cylindrical member, and the detector is provided on a flat surface of the plate portion.

3. The sensor module according to claim 1, wherein a material of the resistor element electrode is different from a material of the linear conductor.

4. The sensor module according to claim 1, wherein the resistor element is rectangular in a plan view, and mutually opposed linear sides of the resistor element each are located between the inner side and an outer side opposed to the inner side of the linear portion of the pair of resistor element electrodes.

5. The sensor module according to claim 1, wherein widths of the resistor element electrodes are the same.

6. A method for producing the sensor module according to claim 1, the method comprising:

coating the fluid conductive material to a flat surface of the diaphragm in a first direction to form the pair of resistor element electrodes, coating the fluid conductive material between the pair of resistor element electrodes on the flat surface of the diaphragm in a second direction intersecting the first direction to form the resistor element; and forming the linear conductor after the resistor element is formed.

* * * * *